United States Patent
Yeon et al.

(10) Patent No.: US 7,924,779 B2
(45) Date of Patent: Apr. 12, 2011

(54) APPARATUS AND METHOD FOR ALLOCATING FREQUENCY RESOURCES IN MOBILE COMMUNICATION SYSTEM

(75) Inventors: Hae-Dong Yeon, Bucheon-si (KR); Yun-Sang Park, Suwon-si (KR); Min-Goo Kim, Yongin-si (KR); Bong-Gee Song, Seongnam-si (KR); Young-Mo Gu, Suwon-si (KR); Jae-Yong Lee, Seongnam-si (KR); Sung-Soo Kim, Seoul (KR); Sang-Hyuck Ha, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 874 days.

(21) Appl. No.: 11/390,126

(22) Filed: Mar. 27, 2006

(65) Prior Publication Data

US 2006/0215606 A1   Sep. 28, 2006

(30) Foreign Application Priority Data

Mar. 25, 2005   (KR) ........................ 10-2005-0025179

(51) Int. Cl.
*H04W 4/00*   (2009.01)
(52) U.S. Cl. ........ 370/329; 370/203; 370/208; 370/210; 370/252; 370/310; 370/322; 370/328

(58) Field of Classification Search .................... None
See application file for complete search history.

(56) References Cited

U.S. PATENT DOCUMENTS

| | | | |
|---|---|---|---|
| 7,149,252 B2 | 12/2006 | Propp et al. | |
| 7,668,253 B2 | 2/2010 | Hwang et al. | |
| 2004/0190484 A1 | 9/2004 | Shin et al. | |
| 2005/0201477 A1* | 9/2005 | Cho et al. | 375/260 |
| 2008/0159436 A1* | 7/2008 | Cho et al. | 375/299 |

FOREIGN PATENT DOCUMENTS

| | | |
|---|---|---|
| KR | 1020030089996 | 11/2003 |
| KR | 1020040066789 | 7/2004 |
| KR | 1020040083787 | 10/2004 |
| KR | 100651454 | 11/2006 |

\* cited by examiner

*Primary Examiner* — Charles N Appiah
*Assistant Examiner* — Mazda Sabouri
(74) *Attorney, Agent, or Firm* — The Farrell Law Firm, P.C.

(57) ABSTRACT

Disclosed is an apparatus and a method for effectively allocating frequency resources in a mobile communication system. The method includes: determining a first offset of a preset frequency band from among all frequency bands, determining a second offset corresponding to a symbol unit in the preset frequency band, and allocating frequency resources to data, the frequency resources corresponding to a sum of the first offset and the second offset.

20 Claims, 11 Drawing Sheets

Encoded Data Burst

Allocated Band 0

Allocated Band 1

Allocated Band 2

Allocated Band 3

APPARATUS AND METHOD FOR ALLOCATING FREQUENCY RESOURCES IN MOBILE COMMUNICATION SYSTEM

PRIORITY

This application claims priority to an application entitled "Apparatus And Method For Allocating Frequency Resources In Mobile Communication System" filed in the Korean Industrial Property Office on Mar. 25, 2005 and assigned Serial No. 2005-25179, the contents of which are incorporated herein by reference.

BACKGROUND OF THE INVENTION

1. Field of the Invention

The present invention relates to a mobile communication system, and more particularly, to an apparatus and a method for allocating frequency resources in a mobile communication system.

2. Description of the Related Art

The Institute of Electrical and Electronics Engineers (IEEE) 802.16 d/e communication system is a broadband wireless access communication system which enables high speed/large capacity communication for mobile stations by using sub-carriers or sub-channels which are frequency resources orthogonal to each other. Schemes used for the high speed/large capacity communication include a Band Adaptive Modulation and Coding (Band AMC) scheme.

The Band AMC scheme refers to a modulation and coding scheme which adaptively changes according to channel conditions of a base station. For example, according to the Band AMC scheme, a base station uses a higher-order modulation scheme and a lower-order coding scheme for a mobile station having a relatively good channel condition, in order to improve the transmission efficiency, and transmits data by using a lower-order modulation scheme and a higher-order coding scheme for a mobile station having a relatively poor channel condition. In other words, the Band AMC scheme employs an optimum modulation scheme and an optimum coding scheme based on the channel condition of a mobile station. Therefore, by the Band AMC scheme, it is possible to actively account for the channel environment and effectively use the frequency resources.

Meanwhile, in view of the frame structure of the broadband wireless access communication system, the sub-channels of the system can be divided into diversity sub-channels and Band AMC sub-channels. The diversity sub-channels are allocated to mobile stations in relatively poor channel conditions and the Band AMC sub-channels are allocated to mobile stations in relatively good channel conditions. However, the current IEEE 802.16 d/e standards have yet to present any specific sub-channel allocation scheme.

SUMMARY OF THE INVENTION

Accordingly, the present invention has been made to solve the above-mentioned problems occurring in the prior art, and an object of the present invention is to provide an apparatus and a method for effectively allocating frequency resources in a mobile communication system.

It is another object of the present invention to provide an apparatus and a method for effectively allocating frequency resources by the symbol in a mobile communication system.

In order to accomplish this object, there is provided a method for frequency resource allocation in a mobile communication system, the method including determining a first offset of a preset frequency band from all frequency bands, determining a second offset corresponding to a symbol unit in the preset frequency band, and allocating frequency resources to data, the frequency resources corresponding to a sum of the first offset and the second offset.

In accordance with the present invention, there is provided an apparatus for transmitting a sub-channel signal in a mobile communication system, including a sub-channel allocator for allocating a sub-channel for transmission of data and providing the data to the sub-channel for transmission of the data through the sub-channel in each predetermined time period unit, and a transmitter for transmitting the sub-channel signal from the sub-channel allocator.

In accordance with the present invention, there is provided an apparatus for transmitting a sub-channel signal in a mobile communication system, including a permutor unit for, when data to be transmitted are input, permuting the data and then transferring a data address for the permuted data, a packet buffer for storing the data at the data address transferred from the permutor, a symbol buffer for storing the data transferred from the packet buffer in each time period unit, and a sub-channel allocator for allocating each sub-channel for transmission of the data of the packet buffer, and controlling the data of the packet buffer to be stored in the symbol buffer, so that the data can be transmitted through the sub-channel in each time period unit.

In accordance with the present invention, there is provided a method for transmitting a sub-channel signal in a mobile communication system, including, when data to be transmitted are input, permuting the data and then storing the permuted data at a data address for the permuted data, allocating a sub-channel for transmitting the permuted data, and storing the sub-channel for each time period unit so that the permuted data can be transmitted through the sub-channel.

In accordance with the present invention, there is provided an apparatus for receiving a sub-channel signal in a mobile communication system, including a receiver for receiving data, and a sub-channel de-allocator for, when data are received from the receiver, de-allocating a sub-channel to which the data are allocated, and controlling the data to be received in each predetermined time period unit through the sub-channel.

BRIEF DESCRIPTION OF THE DRAWINGS

The above and other objects, features and advantages of the present invention will be more apparent from the following detailed description taken in conjunction with the accompanying drawings, in which:

FIG. 8 illustrates a first method for allocating Band AMC sub-channels according to the present invention;

FIG. 9 illustrates a second method for allocating Band AMC sub-channels according to the present invention;

DETAILED DESCRIPTION OF THE PREFERRED EMBODIMENT

Hereinafter, preferred embodiments of the present invention will be described with reference to the accompanying drawings. In the following description, a detailed description of known functions and configurations incorporated herein will be omitted for the sake of clarity and conciseness.

The present invention proposes an apparatus and a method for effectively allocating frequency resources in a mobile communication system. As used herein, the frequency resources refer to diversity sub-channels and Band AMC sub-channels used in the IEEE 802.16 d/e communication system (a broadband wireless access communication system). Therefore, the present invention is applicable to all communication systems using orthogonal frequency resources, such as the IEEE 802.16 d/e communication system. For the sake of convenience, the following description is given of a preferred case of allocating the Band AMC sub-channels.

Prior to description of the present invention, the basic unit for the Band AMC sub-channel is defined as a bin which includes nine contiguous sub-carriers in a same symbol period.

Figure 1:
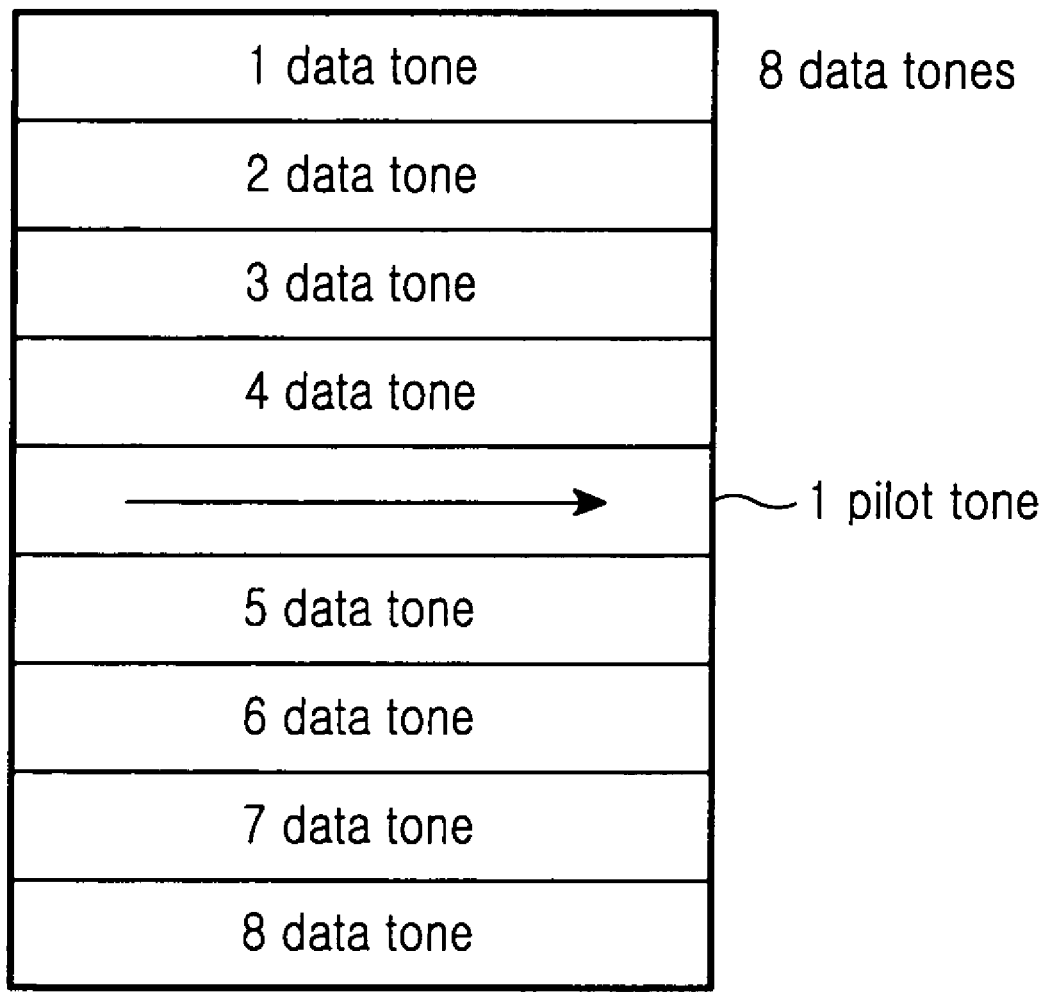
FIG. 1 illustrates a structure of a typical Band AMC sub-channel, in which a bin of the Band AMC sub-channel consists of sub-carriers including data tones and pilot tone.

Referring to FIG. 1, which illustrates a structure of a typical Band AMC sub-channel, a bin constituting the Band AMC sub-channel consists of nine sub-carriers, which include eight data tones and one pilot tone.

One Band AMC sub-channel consists of six bins. Since one bin consists of nine sub-carriers, one Band AMC sub-channel consists of 54 sub-carriers in total, which include 48 data sub-carriers and six pilot sub-carriers.

Figure 2:
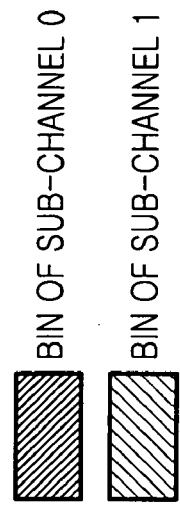
FIG. 2 is a view illustrating a method for constructing one Band AMC sub-channel by using six bins according to the present invention.

FIG. 2 is a view illustrating a method for constructing one Band AMC sub-channel by using six bins according to the present invention.

Referring to FIGS. 2A through 2D, the Band AMC sub-channel constructed from six bins may have bin structures of various types including "1×6 type", "2×3 type", "3×2 type", and the default type. The number in each bin indicates an index of the bin within the Band AMC sub-channel including the bin. Meanwhile, according to the default type bin structure as shown in FIG. 2D, six bins from bin #0 to bin #5 of the first sub-channel are first filled, and six bins from bin #0 to bin #5 of the second sub-channel are then filled.

Meanwhile, information about the type of the Band AMC sub-channel in the current frame is defined in the "Subchannel type for Band AMC" field from the format configuration Information Elements (IEs) in the Hybrid Automatic Repeat reQuest (HARQ) MAP message. As shown in FIG. 2D, the index of the first bin of the $0^{th}$ sub-channel is assigned "0", and the index of the next bin is assigned "1." In the same manner, all the bins within the $0^{th}$ sub-channel are assigned indexes. After the bin indexing of the $0^{th}$ sub-channel is completed, a bin indexing of the first sub-channel is performed in the same manner.

Figure 3:
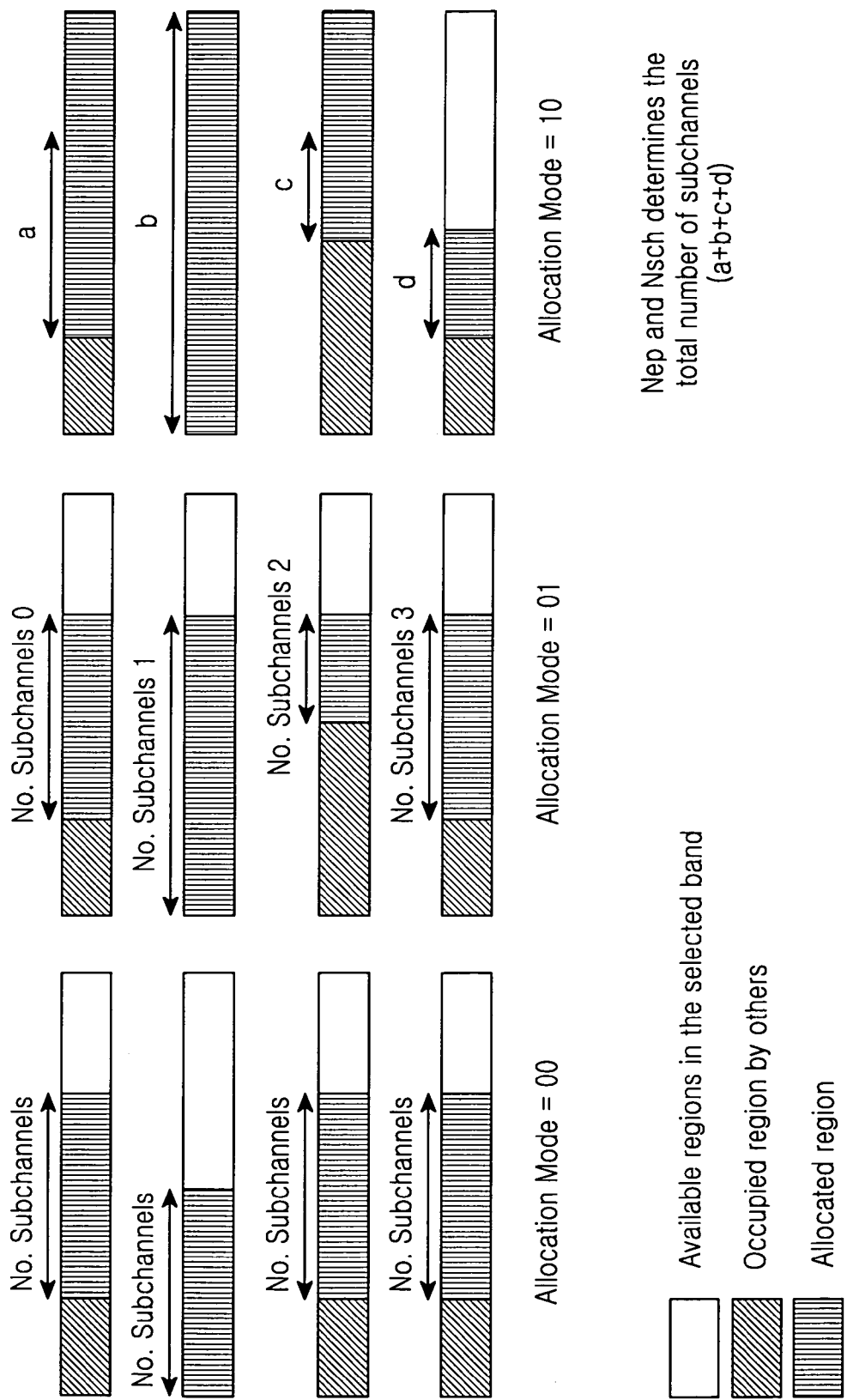
FIG. 3 illustrates a method for Band AMC sub-channel allocation according to the present invention.

FIG. 3 illustrates a method for Band AMC sub-channel allocation according to the present invention.

As noted from FIG. 3, the method for allocating the Band AMC sub-channels to bands includes three types, when briefly classified.

First, the method of "Allocation Mode=00" refers to a method of allocating the same number of sub-channels to all bands allocated to a mobile station. In the method of "Allocation Mode=00," the numbers of the sub-channels within the allocated areas are the same. Next, the method of "Allocation Mode=01" refers to a method of allocating different numbers of sub-channels to bands allocated to a mobile station. Finally, the method of "Allocation Mode=10" refers to a method of sequentially allocating all sub-channels according to the sequence of the allocated bands.

Figure 4:
FIG. 4 illustrates a scheme for Band AMC sub-channel allocation according to the present invention.
Figure 4:
Figure 4:
Figure 4:
Figure 4:
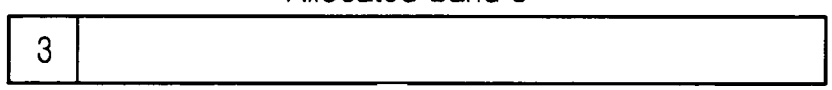

FIG. 4 illustrates a scheme for Band AMC sub-channel allocation according to the present invention.

Referring to FIG. 4, the encoded data bursts have different sizes. For convenience of description, sequence numbers are given to the encoded data bursts.

When different sized data of each mobile station are allocated to bands, data burst 0 may be allocated to Allocated Band 0, data burst 1 may be allocated to Allocated Band 1, data burst 2 may be allocated to Allocated Band 2, and data burst 3 may be allocated to Allocated Band 3. It is noted from FIG. 4 that the start positions of the data allocated to the bands are different with respect to each other. This implies that the sequence of the encoded data bursts varies from the sequence in which the data bursts are actually allocated to symbols.

Figure 5:
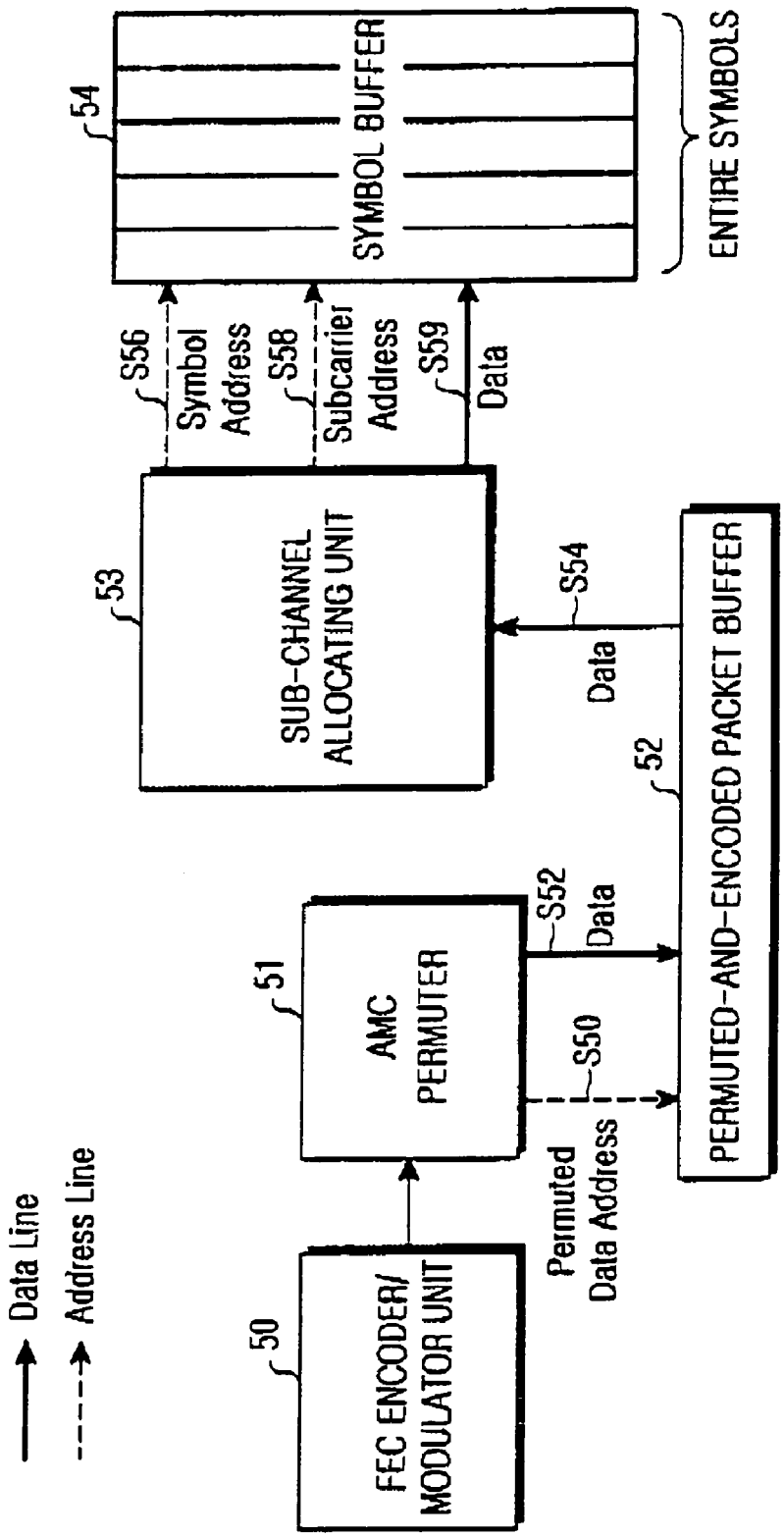
FIG. 5 is a block diagram of a first embodiment of a Band AMC sub-channel allocator according to of the present invention.

Specifically, among the data bursts, the last encoded No. 3 data burst is allocated to the foremost sub-channel in the actual symbol, and the first encoded No. 0 data burst is allocated to the final sub-channel in the actual symbol. In order to solve such a problem, a base station may secure the buffer size as large as the entire bands for the Band AMC sub-channels and allocate the Band AMC sub-channels according to the sequence of the encoded data bursts. However, the above-mentioned scheme for Band AMC sub-channel allocation using a buffer size is limited by a condition that it is necessary to secure as large a buffer size as the entire Band AMC sub-channel bands. FIG. 5 is a block diagram of a first embodiment of a Band AMC sub-channel allocator according to of the present invention. The Band AMC sub-channel allocator includes a Forward Error Correction (FEC) encoder/modulator unit 50, an AMC permuter 51, a permuted-and-encoded packet buffer 52, a sub-channel allocating unit 53 and a symbol buffer 54.

The FEC encoder/modulator unit 50 is connected to the AMC permuter (In FIGS. 5,6,7, we corrected "permutor" to "permuter".) 51 which is located between the FEC encoder/modulator unit 50 and the permuted-and-encoded packet buffer 52. The AMC permuter 51 performs permutation only during the Band AMC allocation. The permutation is an operation performed in order to minimize interference between base stations in an OFDMA communication system.

The permutation is performed in the following manner:

By defining a sequence representing indexes of sub-carriers of the Band AMC sub-channel, it is possible to define the sub-channel corresponding to the sequence. For example, on an assumption that entire sub-carriers in an OFDMA Band AMC sub-channel have 48 indexes of {0, 1, 2, . . . , 47}, the 48 sub-carriers can be grouped into six bins, each of which includes eight sub-carriers.

Further, permutation of a basic sequence is used in order to identify a sub-channel used in a base station. The permutation performed in the case of allocating data symbols to sub-carriers in the Band AMC sub-channel can be defined by Equation (1) below. From among the 48 data symbols allocated to the Band AMC sub-channel, the $j^{th}$ symbol is mapped to $(S_{per}^{off}(j)-1)^{th}$ sub-carrier, wherein $S_{per}^{off}(j)$ is the $j^{th}$ element of the sequence $S_{per}^{off}$, and j has a range between 0 and 47.

$$S_{per}^{off}(j) = \begin{cases} P_{per}(j) + \text{off} & P_{per}(j) + \text{off} \neq 0 \\ \text{off} & P_{per}(j) + \text{off} = 0 \end{cases} \quad (1)$$

In Equation (1), $P_{per}(j)$ is the $j^{th}$ element of a signal sequence obtained by cyclic-shifting the basic sequence $P_0$ to the left by the amount of per. Also, $P_0$ is the basic permutation defined in $GF(7^2)$ and can be expressed as a set of septenary numbers, {01, 22, 46, 52, 42, 41, 26, 50, 05, 33, 62, 43, 63, 65, 32, 40, 04, 11, 23, 61, 21, 24, 13, 60, 06, 55, 31, 25, 35, 36, 51, 20, 02, 44, 15, 34, 14, 12, 45, 30, 03, 66, 54, 16, 56, 53, 64, 10}. Also, per=$ID_{cell}$mod48, and off=($\lceil ID_{cell} \div 48 \rceil$)mod49.

In Equation (1), an equation for obtaining $S_{per}^{off}$ is defined by $GF(7^2)$, and an operation according to $GF(7^2)$ is applied to the equation. That is to say, addition in $GF(7^2)$ corresponds to a mod7 operation for each digit. Here, GF(Q) represents Galois Field(Q).

Therefore, the AMC permuter 51 transfers permuted data address value to the permuted-and-encoded packet buffer 52 as indicated by reference numeral S50 and transfers data stored at a corresponding address to the permuted-and-encoded packet buffer 52 as indicated by reference numeral S52. Then, the permuted-and-encoded packet buffer 52 stores the permuted data in the buffer by using the received data address value. Thereafter, as indicated by S54, the permuted-and-encoded packet buffer 52 transfers the stored data to the sub-channel allocating unit 53. Then, the Band AMC sub-channel allocating unit 53 provides the data to the symbol buffer 54 through a data line as indicated by reference numeral S59. At this time, the sub-channel allocating unit 53 need not provide the data address to the permuted-and-encoded packet buffer 52, because the sub-channel allocating unit 53 sequentially receives the data from the permuted-and-encoded packet buffer 52. However, when the sub-channel allocating unit 53 actually provides the data to the symbol buffer 54, the sub-channel allocating unit 53 needs to provide the symbol address (as indicated by S56) and the address locating the sub-carrier within the symbol buffer 54 (as indicated by S58) together with the data to the symbol buffer 54.

Figure 6:
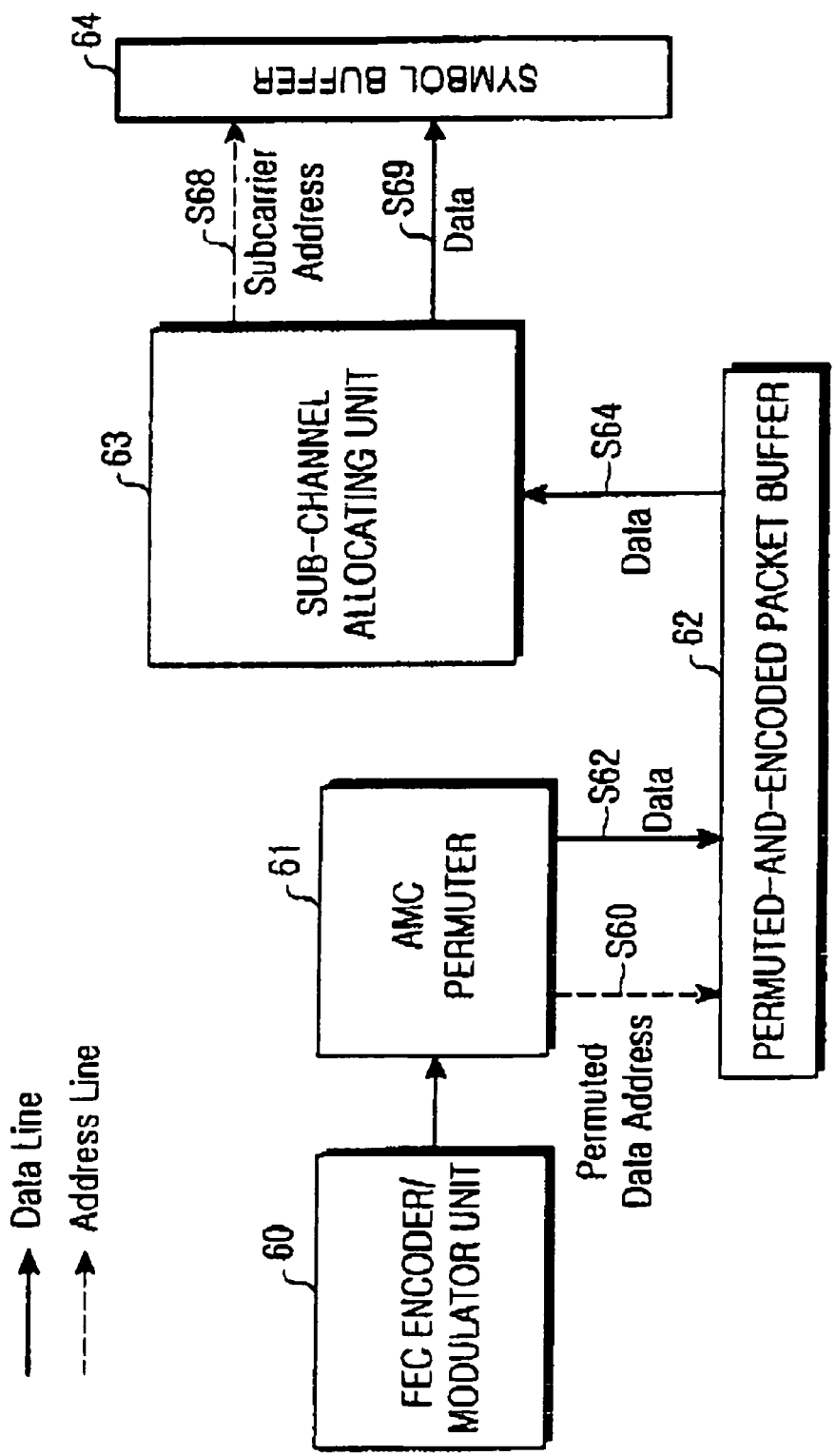
FIG. 6 is a block diagram of a second embodiment of a Band AMC sub-channel allocator according to of the present invention.

The above described embodiment of the present invention involves the case of performing allocation/de-allocation after reception of all symbols in the Band AMC period. FIG. 6 is a block diagram of a second embodiment of a Band AMC sub-channel allocator according to the present invention.

The Band AMC sub-channel allocator shown in FIG. 6 has a structure similar to that of the Band AMC sub-channel allocator shown in FIG. 5. However, the symbol buffer 54 of FIG. 5 has a size corresponding to the entire Band AMC sub-channel band, while the symbol buffer 64 of FIG. 6 has a size corresponding to the symbol unit. Further, the two allocators differ in that the sub-channel allocating unit 63 transfers a data address value to the permuted-and-encoded packet buffer 62, and the symbol address value is not transferred from the sub-channel allocating unit 63 to the symbol buffer 64.

An AMC permuter 61 provides an address of data to be allocated to the permuted-and-encoded packet buffer 62 through an address line as indicated by S60. The sub-channel allocating unit brings the data corresponding to this address from the permuted-and-encoded packet buffer 62 through a data line as indicated by S64. When the data is allocated by the symbol, the symbol address value may be unnecessary for the sub-channel allocating unit 63. Further, the AMC permuter 61 receives data symbols from the FEC encoder/modulator unit 60 according to the sequence in which the data symbols are processed. Then, the AMC permuter 61 directly processes the data symbols by the unit of the sub-channel as soon as it receives them. In order to lower the complexity of the Band AMC sub-channel allocator, the AMC permuter 61 may be either separate from or incorporated in the sub-channel allocating unit 63. The sub-channel allocating unit 63 takes the data stored in the permuted-and-encoded packet buffer 62 and then re-stores the data at a predetermined position in the symbol buffer 64.

Figure 7:
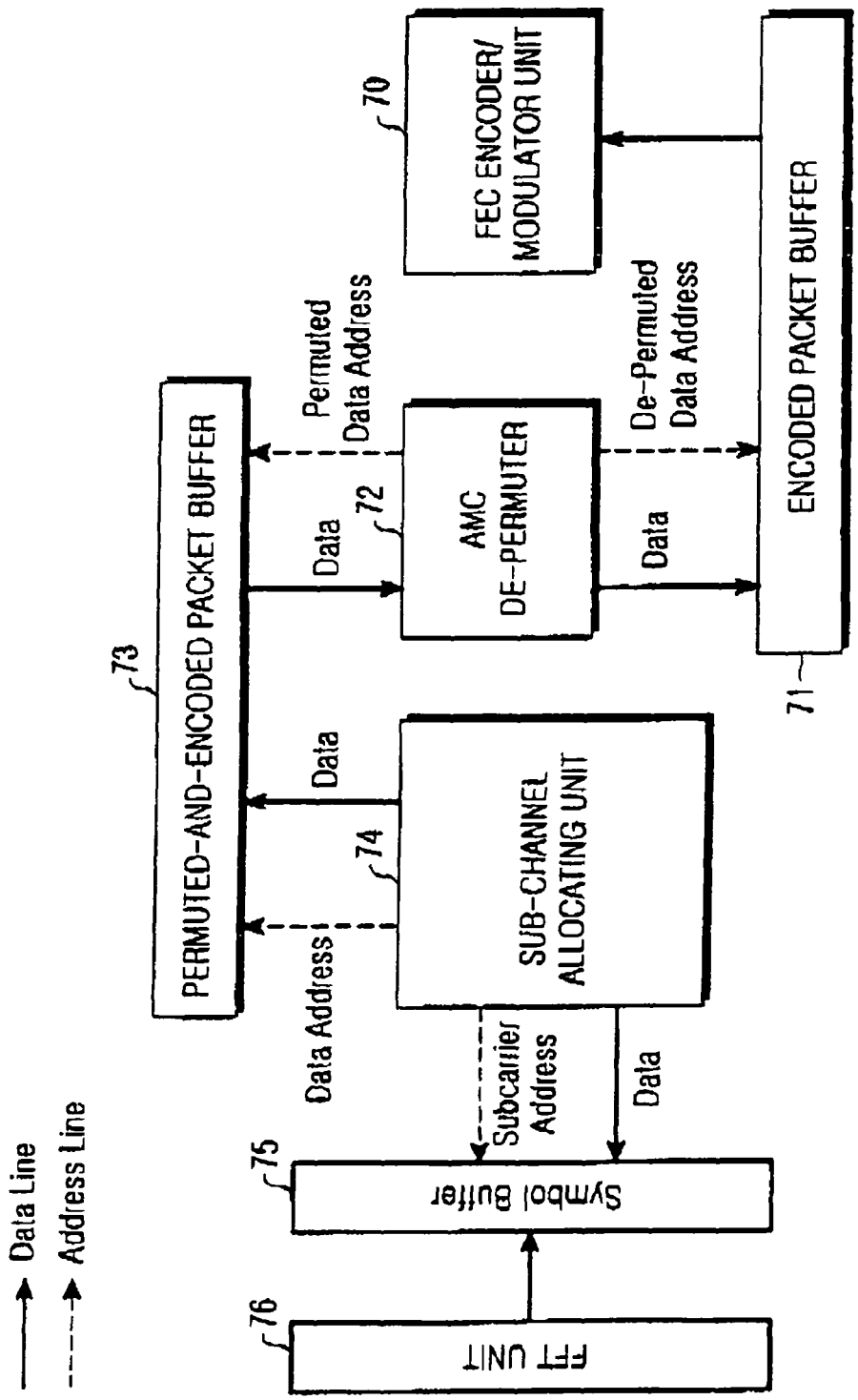
FIG. 7 is a block diagram of a Band AMC sub-channel de-allocator according to the present invention.

FIG. 7 is a block diagram of a Band AMC sub-channel de-allocator according to the present invention.

The Band AMC sub-channel de-allocator shown in FIG. 7 operates according to a basic principle similar to the operation of the Band AMC sub-channel allocator shown in FIG. 6. However, the only difference between the de-allocator of FIG. 7 and the allocator of FIG. 6 is that the signal flow in the de-allocator is opposite to the signal flow in the allocator. Therefore, a detailed description of the operation of the de-allocator shown in FIG. 7 will be omitted here.

The above description of each element is based mainly on implementation of the IEEE 802.16 d/e which is a representative of the OFDMA (Orthogonal Frequency Division Multiple Access) PHY-related standards. Here, the method of calculating an address of data to be brought and calculating an address at which the data must be stored is applicable to all the other OFDMA PHY systems. Therefore, the block diagrams of the Band AMC allocator/de-allocator are applicable to all OFDMA PHY systems.

Figures 8, 9:
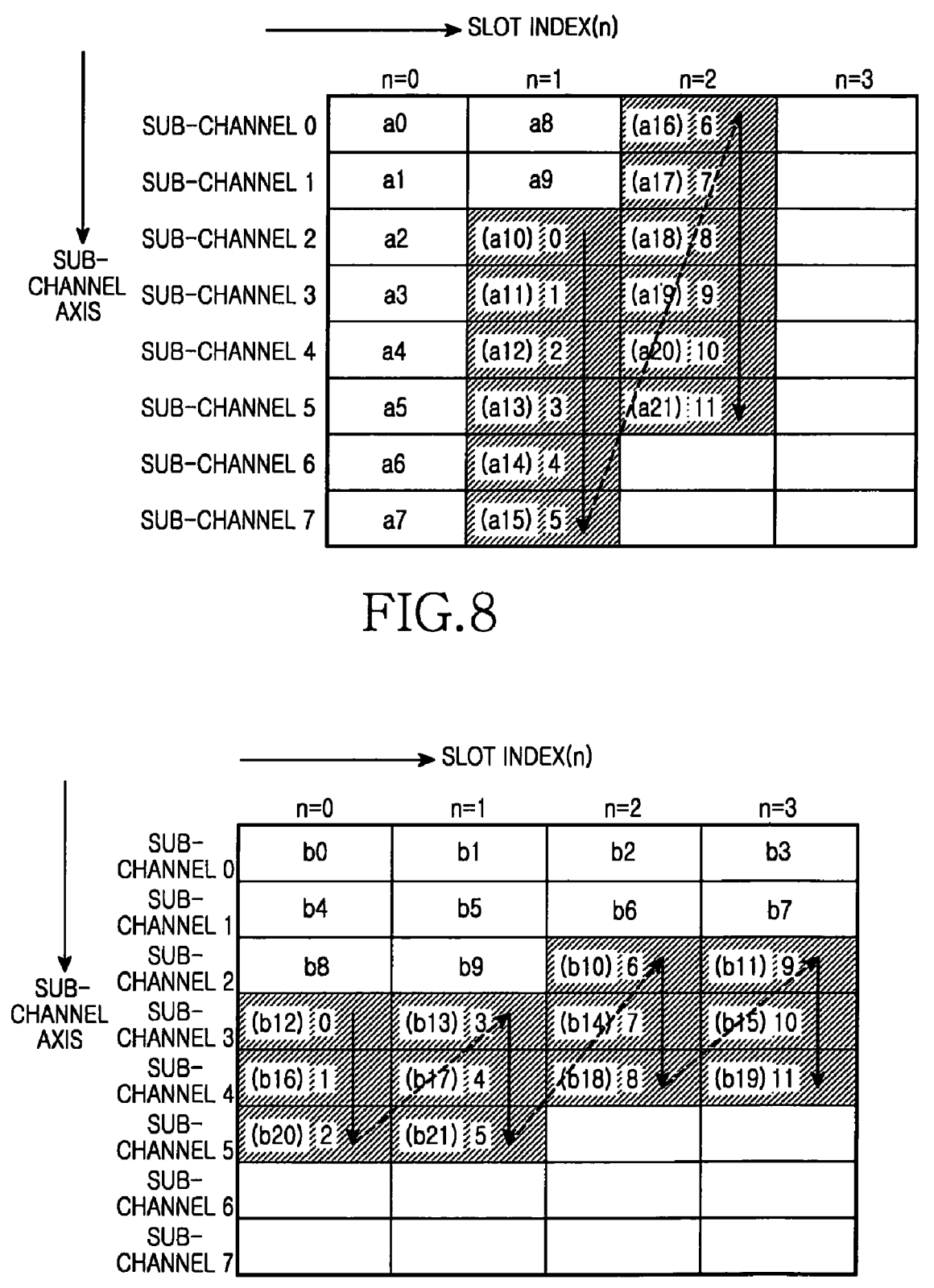

FIG. 8 illustrates a first method for allocating Band AMC sub-channels according to the present invention, and FIG. 9 illustrates a second method for allocating Band AMC sub-channels according to the present invention.

In FIGS. 8 and 9, the slot index (n) denotes an index of each slot in a time domain, which is taken by one sub-channel, and the sub-channel index denotes an index of each sub-channel in a frequency domain. For example, one slot corresponds to six symbol periods in the case of the 1×6 type sub-channel, and one slot corresponds to three symbol periods in the case of the 2×3 type sub-channel.

FIGS. 8 and 9 are based on an assumption that one band includes eight sub-channels along a sub-channel axis and four slots along a slot axis. Further, it is assumed that the start point of the allocation is 10, and the number of all sub-channels to be allocated is 12.

In FIG. 8, the sub-channel indexing is based on the sub-channel axis, and the sub-channel allocation is performed by using Equations (2) and (3) below.

$$\text{SlotStart}[i] = \lfloor \text{BandAllocStart}[i] \div \text{NschPerSlot} \rfloor, \quad (2)$$

where i=0, ... , NusedBand−1

Since the sub-channel indexing is based on the sub-channel axis as described above, the sequence number of the allocation area increases in the manner of a0, a1, ... , and a10 denotes the beginning point of the allocation. Further, since the data allocation is also performed based on the sub-channel axis, the data allocation is begun from a10 and is sequentially performed up to a21 based on the sub-channel axis. If data allocation to all sub-channels has been completed at slot index 1, the data allocation is performed again from the first sub-channel of the next slot having an index of 2.

In Equation (2), BandAllocStart[i] denotes the beginning point of allocation for each band, and i denotes a sequence number of each band or an index of an allocated band. Further, NschPerSlot denotes the number of sub-channels included in one slot period within one band, and $\lfloor \ \rfloor$ denotes the operation of rounding-down. In FIG. 8, when the beginning point for the $0^{th}$ band is 10, BandAllocStart[0]=10 and NschPerSlot=8. Therefore, SlotStart[0]=1.

In this case, the allocation at the current symbol for each band is performed when the slot index at the current symbol (i.e. SlotCount) is larger than or equal to the SlotStart obtained by Equation (2) and there remains a sub-channel to be allocated. It is assumed that the SlotCount increases according to the re-increase of the symbol count after it is reset to 0 at the beginning point of the Band AMC period.

When the SlotCount of the current symbol for each band corresponds to the SlotStart obtained by Equation (2), the position at which data will be allocated at the current symbol is determined by Equation (3) below, which is performed only when SlotCount≧SlotStart[i] and BandResidualNsch[i]!=0.

if (SlotCount=SlotStart[i])start*Sch*N=BandAllocStart
[i]mod*Nsch*PerSlot else start*Sch*N=0 if (BandResidual*Nsch*[i]≦(*Nsch*PerSlotStart*Sch*N))
end*Sch*N=start*Sch*N+BandResidual*Nsch*[i] else
end*Sch*N=*Nsch*PerSlot  (3)

In Equation (3), startSchN denotes the index of a sub-channel from which allocation at a corresponding slot will begin, and endSchN denotes (the index of a sub-channel fro which the allocation will end+1). The index corresponds to a coordinate value on the sub-channel axis of FIG. 8. Further, BandResidualNsch[i] denotes the number of sub-channels to be allocated for each band. This value is initialized to the number of sub-channels initially allocated to each band and is then obtained by continuously subtracting the number of sub-channels allocated to each slot from the initial value. The StartSchN enables direct calculation of the position of a corresponding sub-channel only at the position of SlotStart and has a sub-channel value of 0 at the other slots. In contrast, it is noted that the value of endSchN is calculated only when BandResidualNsch[i] has a value less than or equal to the number of sub-channels calculated from startSchN and is set to the number of sub-channels included for one slot in a corresponding band in the opposite case. The above-mentioned method is proper for downlink allocation of data bursts from a base station to all mobile station within a cell, due to the facility in its implementation.

Meanwhile, in FIG. 9, the data allocation sequence is based on the symbol axis, and the sub-channel indexing is based on the sub-channel axis. By using Equation (4) below, it is possible to obtain a sequence for defining each sub-channel. First, in FIG. 9, allocation in a current symbol for each band is performed only when there remains a sub-channel to be allocated. That is, the allocation is performed only when BandResidualNsch[i]!=0.

In data allocation of FIG. 9, allocation areas from b10 to b21 are first occupied, and the data allocation is then performed from the position of b12 which has a slot index of 0 and a sub-channel index of 3.

Equation (4) below defines a method for obtaining a start position and an end position of data allocation.

if (SlotCount≧BandAllocStart[i]mod*NAMC*Slot)
start*Sch*N=⌊BandAllocStart[i]÷*NAMC*Slot⌋ else
start*Sch*N=⌊BandAllocStart[i]÷*NAMC*Slot⌋+1 if (SlotCount≧*Sch*AllocEndmod*NAMC*Slot)
end*Sch*N=⌊*Sch*AllocEnd÷*NAMC*Slot⌋ else
end*Sch*N=⌊*Sch*AllocEnd÷*NAMC*Slot⌋+1  (4)

Figure 10:
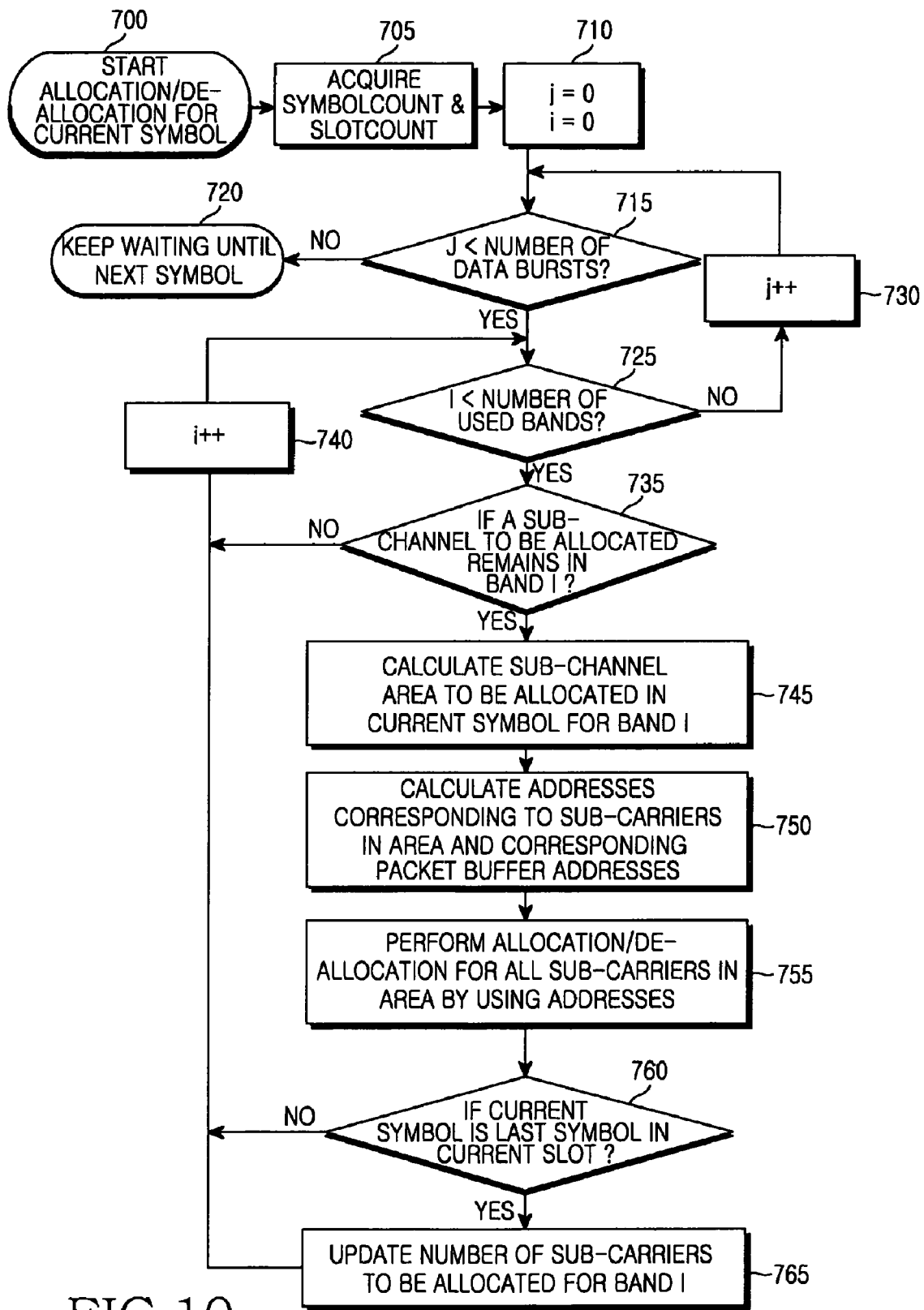
FIG. 10 is a flowchart of a method for allocation/de-allocation for each symbol by a Band AMC sub-channel allocator/de-allocator according to the present invention.

In Equation (4), NAMCSlot denotes the number of slots during a Band AMC sub-channel period and is thus 4 in FIG. 10. Further, SchAllocEnd denotes a sum of the beginning position of allocation for each band and the number of sub-channels allocated to each band. The endSchN in Equation (4) also refers to (a sub-channel index at which the allocation ends+1). Therefore, when the slot index is 0 or 1 in FIG. 9, startSchN is 3 and endSchN is 6. Also, when the slot index is 2 or 3, startSchN is 2 and endSchN is 5. This method is proper for uplink allocation because it facilitates terminal power control and dispersion.

When area allocation has been accomplished through the two methods for sub-channel allocation as described above, the storage position in a symbol buffer for each symbol can be obtained by using Equation (5) below.

BinOffset=BandIndex[i]×BinPerband+s×BinPer-
*Sch*Sym  (5)

In Equation (5), s denotes a sub-channel index in a corresponding band and has a value between startSchN and endSchN (startSchN≦s<endSchN). Further, BinPerband denotes the number of bins included in one band for each symbol, and BinPerSchSym denotes the number of bins included in one sub-channel for each symbol. For example, when the sub-channel in FIG. 9 is the 2×3 type, BinPerband is 16 and BinPerSchSym is 2. Further, when BinOffset is 9, the actual symbol buffer address is (BinOffset×9+m), wherein m denotes an index of a sub-carrier within a bin and has a value of 0~8. Therefore, the symbol buffer address has a value of 81~89.

Further, Equation (5) is expressed by a sum of a start position at a corresponding band obtained by using a bin index and a bin index of a sub-channel allocated within the band. In conclusion, by Equation (5), it is possible to obtain a position of a bin at which data to be currently allocated will be located. A detailed description about a method for obtaining a position of a sub-carrier to be allocated data from among the used sub-carrier indexes of 0~863 by using BinOffset obtained by Equation (5) and then changing the obtained position to an address in a symbol buffer will be omitted here.

Hereinafter, an address of data in a packet buffer, which is allocated in a current symbol, will be calculated. This process of calculation can be defined by Equation (6) below.

DataOffset=entire offset for subchannel to be allocated for each band+data offset in subchannel according to symbol DataOffset=48×(AccSchPerBand[i]+(Band*Nsch*[i]−
BandResidual*Nsch*[i])+(s−start*Sch*N))+8×Bin-
Per*Sch*Sym×(SymbolCountmod*N*symbolsInSlot)  (6)

As noted from Equation (6), this address is expressed as an address offset for an allocated sub-channel and an offset of an address value according to the Symbolcount value of the current symbol within the sub-channel. In Equation (6), BandNsch[i] denotes the number of sub-channels allocated to each band, and AccSchPerBand[i] denotes the number of sub-channels accumulated for each band. Further, Nsymbols-InSlot denotes the number of symbols included in one slot which has a value of 3 in the case of 2×3 type.

Specifically, if three, two, four, and two sub-channels have been allocated to four bands, respectively (BandNsch[0]=3, BandNsch[1]=2, BandNsch[2]=4, and BandNsch[3]=2), then AccSchPerBand[0]=0, AccSchPerBand[1]=3, AccSchPerBand[2]=3+2, and AccSchPerBand[1]=3+2+4.

The DataOffset obtained by Equation (6) corresponds to a buffer address of data to be allocated to the first sub-carrier within a corresponding bin, and one bin includes eight data addresses sequentially obtained based on this value.

The value obtained by Equations (5) and (6) represents the beginning position of data allocation in the current symbol for one sub-channel, and each address is obtained while sequentially increasing the index based on the value until the allocation is completed in the current symbol for the sub-channel. Further, the above description about the area allocation and address calculation is based on one data burst, and it is possible to allocate/de-allocate a plurality of data bursts by repeating the above-described method as many times as the number of data bursts.

FIG. 10 is a flowchart of a method for allocation/de-allocation for each symbol by a Band AMC sub-channel allocator/de-allocator according to the present invention.

Referring to FIG. 10, when allocation/de-allocation for the current symbol is begun (step 700), the Band AMC sub-channel allocator/de-allocator must acquire SymbolCount and Slotcount (step 705). Then, in step 710, the Band AMC sub-channel allocator/de-allocator initializes the parameters i and j to 0. In step 715, the Band AMC sub-channel allocator/de-allocator determines whether the current parameter j is less than the number of data bursts. When the current parameter j is greater than or equal to the number of data bursts, the Band AMC sub-channel allocator/de-allocator ends the allocation/de-allocation for the current symbol and keeps waiting until the next symbol allocation (step 720). In contrast, when the current parameter j is less than the number of data bursts, the Band AMC sub-channel allocator/de-allocator determines whether i is less than the number of used bands (step 725). That is, step 725 is a step for determining the number of loop repetitions according to the number of bands. For example, when the number of allocated bands is four, the loop including steps 715, 725 and 730 is repeated four times.

Therefore, when i has a value greater than the number of used bands, the Band AMC sub-channel allocator/de-allocator proceeds to step 730 in which it adds one to j. Then, the Band AMC sub-channel allocator/de-allocator returns to step 715 and repeats the above steps. When i is less than or equal to the number of used bands, the Band AMC sub-channel allocator/de-allocator proceeds to step 735 in which the Band AMC sub-channel allocator/de-allocator determines whether there remains a sub-channel to be allocated to band i. When a sub-channel remains to be allocated, the Band AMC sub-channel allocator/de-allocator proceeds to step 745. When no sub-channel remains to be allocated, the Band AMC sub-channel allocator/de-allocator returns to step 725.

In step 745, the Band AMC sub-channel allocator/de-allocator calculates the sub-channel area for allocation in the current symbol for band i. In step 750, the Band AMC sub-channel allocator/de-allocator calculates address values corresponding to the sub-carriers in the sub-channel area and address values of corresponding packet buffer. In step 755, the Band AMC sub-channel allocator/de-allocator performs allocation/de-allocation of all sub-carriers in the sub-channel area. Then, in step 760, the Band AMC sub-channel allocator/de-allocator determines whether the current symbol is the last symbol. When the current symbol is not the last symbol, the Band AMC sub-channel allocator/de-allocator proceeds to step 740 in which it adds one to i, and then returns to step 725. When the current symbol is the last symbol, the Band AMC sub-channel allocator/de-allocator proceeds to step 765 in which it updates the number of the sub-channels to be allocated for band i.

Figure 11:
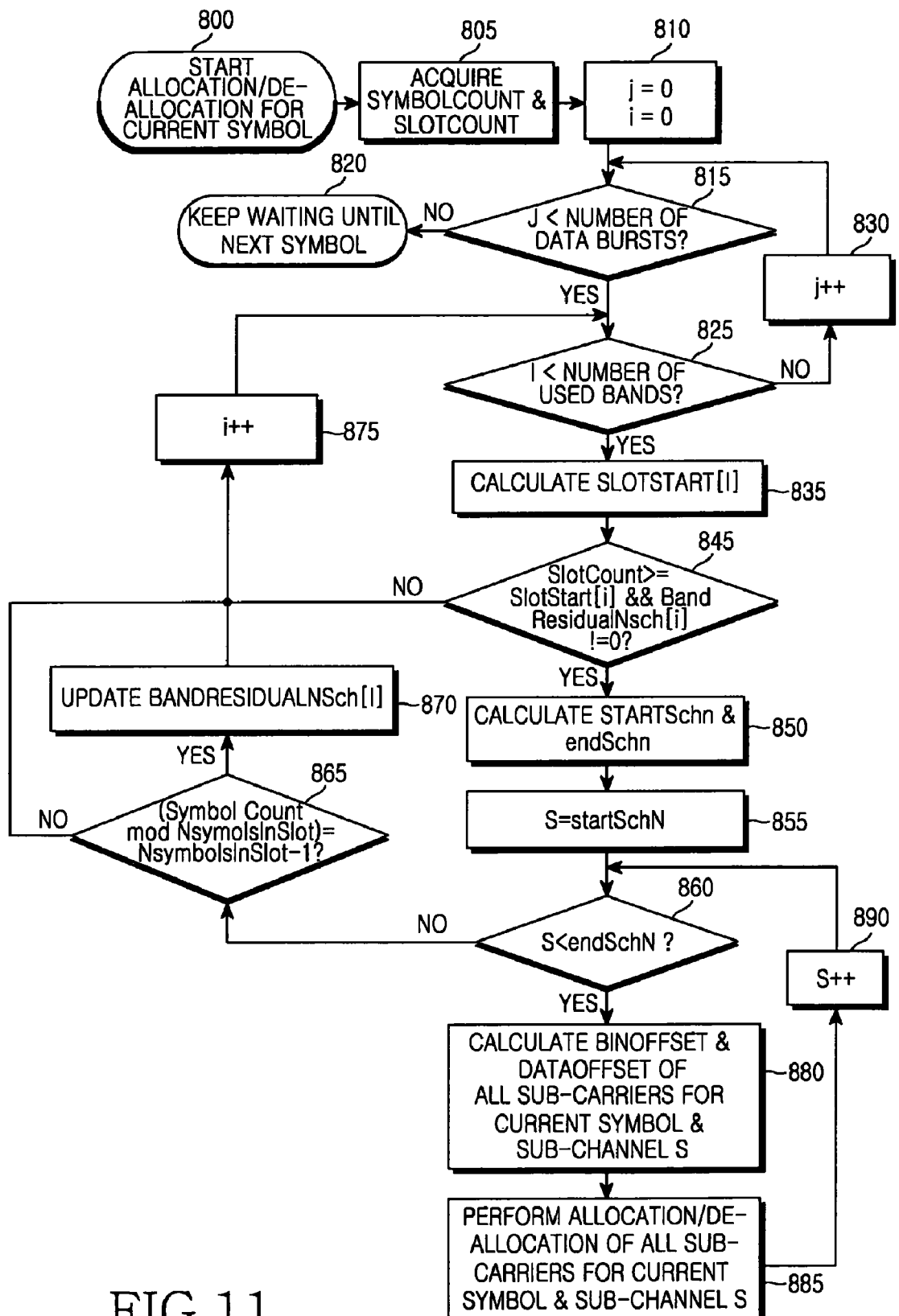
FIG. 11 is a flowchart of the first method for allocating Band AMC sub-channels according to the present invention, as shown in FIG. 8.

FIG. 11 is a flowchart of the first method for allocating Band AMC sub-channels according to the present invention, as shown in FIG. 8.

First, steps 800 through 830 in FIG. 11 are the same as steps 700 through 730 in FIG. 10, so a description thereof is omitted here.

When i is smaller than the number of used bands as a result of the determination in step 825, the Band AMC sub-channel allocator proceeds to step 835 in which it calculates, by using Equation (2), SlotStart[i] which indicates the slot beginning position. Then, in step 845, the Band AMC sub-channel allocator determines whether SlotCount at the current symbol is greater than or equal to the calculated SlotStart[i] and whether there remains a sub-channel to be allocated. That is, the Band AMC sub-channel allocator determines whether BandResidualNsch[i]!=0. As a result of the determination, when the BandResidualNsch[i]!=0, the Band AMC sub-channel allocator proceeds to step 850 in which it calculates startSchN and endSchN by using Equation (3). Then, in step 855, the Band AMC sub-channel allocator sets the calculated startSchN to S.

Thereafter, in step 860, the Band AMC sub-channel allocator determines whether S is smaller than endSchN. As a result of the determination, when S is not smaller than endSchN, the Band AMC sub-channel allocator proceeds to step 865 in which it determines whether a solution of a modulo operation dividing Symbolcount by NsymbolsInSlot is equal to a value obtained by subtracting one from NsymbolsInSlot. As a result of the determination, when the two values are equal, the Band AMC sub-channel allocator proceeds to step 870 in which it updates BandResidualNsch[i], and then adds one to i in step 870. In contrast, when the two values are not equal as a result of the determination in step 865 or the condition is not satisfied as a result of the determination in step 845, the Band AMC sub-channel allocator directly proceeds to step 875.

When it is determined in step 860 that S is less than endSchN, the Band AMC sub-channel allocator proceeds to step 880, in which it calculates BinOffset and Dataoffset for all sub-carriers in the current symbol and sub-channel S by using Equations (5) and (6). Thereafter, in step 885, the Band AMC sub-channel allocator performs allocation/de-allocation of all sub-carriers for the current symbol and sub-channel S. Then, the Band AMC sub-channel allocator adds one to S in step 890 and returns to step 860 from which it repeatedly performs the steps thereafter.

Figure 12:
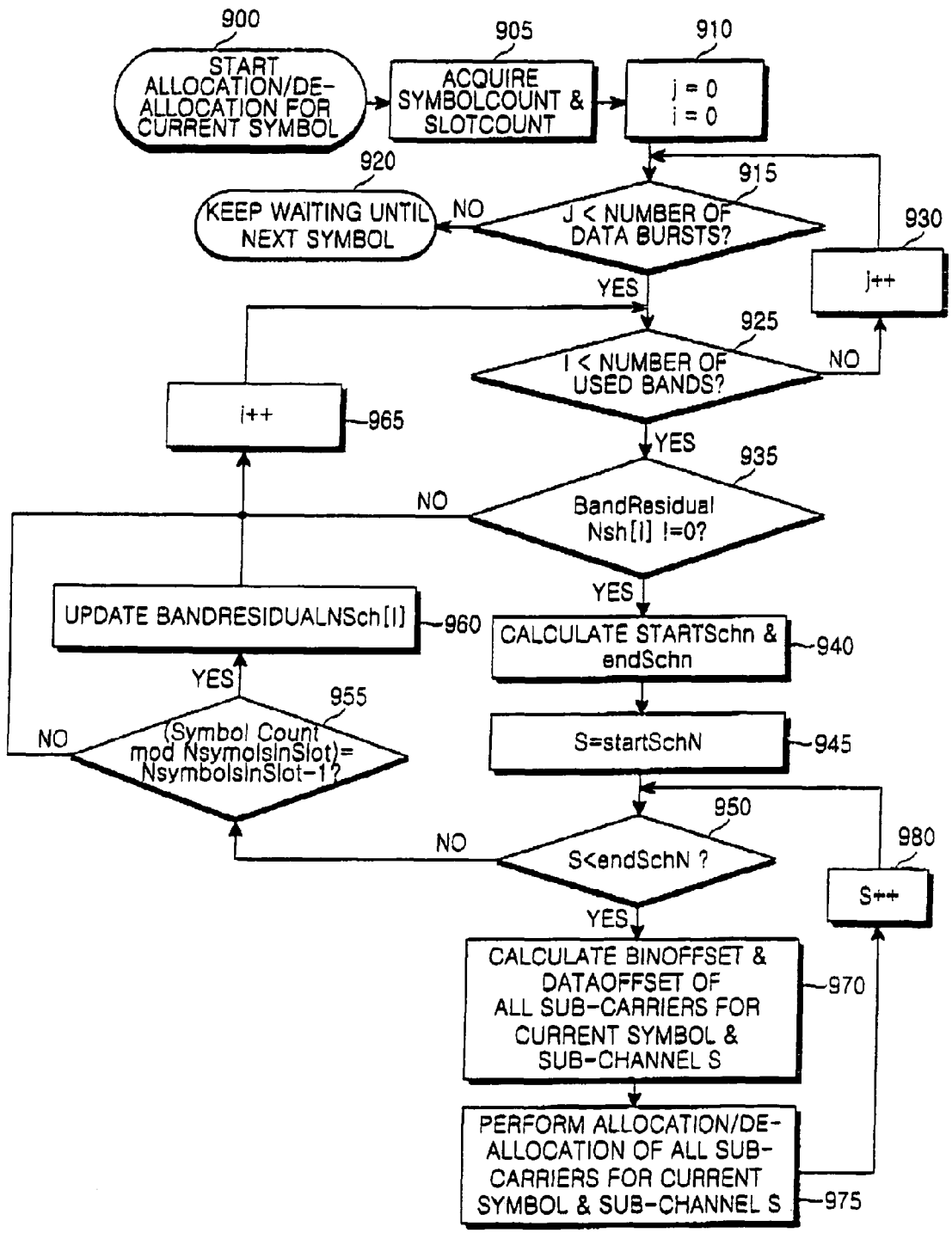
FIG. 12 is a flowchart of the second method for allocating Band AMC sub-channels according to the present invention, as shown in FIG. 9.

FIG. 12 is a flowchart of the second method for allocating Band AMC sub-channels according to the present invention, as shown in FIG. 9.

First, steps 900 through 930 in FIG. 12 are the same as steps 700 through 730 in FIG. 11, so description thereof is omitted here. Thereafter, when i is less than the number of used bands as a result of the determination in step 925, the Band AMC sub-channel allocator proceeds to step 935 in which it determines whether there remains a sub-channel to be allocated, i.e., whether BandResidualNsch[i]!=0. Steps 940 through 980 following the determination in step 935 are the same as steps 850 through 890 in FIG. 11, so description thereof is omitted here.

As noted, the operations of FIGS. 11 and 12 are similar to each other, except for the difference between the methods of calculating startSchN and endSchN for area allocation. Meanwhile, the de-allocation can be performed in an order opposite to that of the allocation. However, only the difference between the allocation and de-allocation is found in the process of storing the data of the symbol buffer into the packet buffer. Therefore, it is possible to perform the de-allocation by applying Equations (2) through (6) with reference to the structure of the Band AMC de-allocator as shown in FIG. 7.

It is possible to relatively easily implement the present invention by arranging a symbol buffer having a size corresponding to an entire Band AMC period in a communication system using an OFDMA scheme. Also, according to the present invention, it is possible to efficiently perform allocation and de-allocation of OFDMA Band AMC sub-channels for each symbol, thereby reducing the buffer size and processing delay. Specifically, the present invention can reduce the buffer size from the entire symbol corresponding to the Band AMC period to one symbol period. Therefore, when an uplink Band AMC period corresponds to 12 symbols, the buffer size can be reduced to 1/12. Therefore, it is possible to reduce the processing delay by the corresponding proportion. Particularly, by reducing the processing delay, it is possible to also reduce the ACK/NACK (ACKnowledgement/Negative ACKnowledgement) delay between a BS and a PSS. In the HARQ (Hybrid Automatic Repeat request), it is possible to remarkably reduce the HARQ buffer by reducing the ACM/NACK delay.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for transmitting a sub-channel signal in a mobile communication system, the apparatus comprising:
a sub-channel allocator for allocating a sub-channel for transmission of data in accordance with permuted positions at which the data is stored, and providing the data to the sub-channel for transmission of the data through the sub-channel in each time period unit; and
a transmitter for transmitting the sub-channel signal from the sub-channel allocator;
wherein the sub-channel allocator comprises:
a first buffer for storing the data at permuted positions according to a control;
a permutation unit for permuting positions at which the data will be stored in the first buffer;
a sub-channel allocating unit for allocating a sub-channel for transmitting the data of the permuted positions, and controlling the data of the permuted positions to be stored in a second buffer, so that the data of the permuted positions can be transmitted through the sub-channel in each time period unit; and
the second buffer for storing the data of the permuted positions by control of the sub-channel allocating unit.

2. The apparatus as claimed in claim 1, wherein the time period unit is a symbol time period unit.

3. The apparatus as claimed in claim 1, wherein the time period unit includes a plurality of symbol time period units.

4. An apparatus for transmitting a sub-channel signal in a mobile communication system, the apparatus comprising:
a permuter unit for, when data to be transmitted are input, permuting the data and then transferring a data address for the permuted data;
a packet buffer for storing the data at the data address transferred from the permuter;
a symbol buffer for storing the data transferred from the packet buffer in each time period unit; and
a sub-channel allocator for allocating each sub-channel for transmission of the data of the packet buffer, and controlling the data of the packet buffer to be stored in the symbol buffer, so that the data can be transmitted through the sub-channel in each time period unit;
wherein the address of the data in the packet buffer in each symbol time period unit corresponds to a sum of an entire offset for sub-channels to be allocated to each band and a data offset within the sub-channel, and the sub-channel allocator performs allocation of sub-carriers within the sub-channel area through addresses obtained by using a set allocation beginning position and the number of sub-channels to be allocated during allocation area and sub-channel indexing.

5. The apparatus as claimed in claim 4, wherein the permuter unit is an element which is constructed in the sub-channel allocator.

6. The apparatus as claimed in claim 4, wherein the address stored in the symbol buffer in each symbol time period unit is defined by $$BinOffset = BandIndex[i] \times BinPerband + s \times BinPerSchSym,$$

wherein s denotes a sub-channel index in a corresponding band and has a value between startSchN and endSchN (startSchN≦s<endSchN), BinPerband denotes a number of bins included in one band for each symbol, and BinPerSchSym denotes a number of bins included in one sub-channel for each symbol.

7. The apparatus as claimed in claim 4, wherein the sub-channel allocator receives data to be transmitted by providing an address of the data to the packet buffer, and provides a sub-carrier address to the symbol buffer to thereby control storage of the data at a set position in the symbol buffer so that the data is transmitted in each symbol time period unit.

8. The apparatus as claimed in claim 7, wherein the sub-channel allocator calculates a sub-channel area to be allocated for a current single symbol time period in the sub-band and performs sub-channel indexing for area allocation and data allocation, thereby obtaining an address for the data of the packet buffer and addresses for sub-carriers within the sub-channel area.

9. The apparatus as claimed in claim 4, wherein the sub-channel indexing for data allocation and the area allocation are performed based on a sub-channel axis.

10. The apparatus as claimed in claim 4, wherein the area allocation is performed based on a symbol axis, and the sub-channel indexing for data allocation is performed based on a sub-channel axis.

11. A method for transmitting a sub-channel signal in a mobile communication system, the method comprising the steps of:
(1) permuting data and then storing the permuted data at a data address for the permuted data, when data to be transmitted are input;
(2) allocating a sub-channel for transmitting the permuted data; and
(3) storing the sub-channel for each time period unit so that the permuted data can be transmitted through the sub-channel;
wherein step (3) comprises the sub-steps of:
(a) calculating a sub-channel area to be allocated for a current single symbol time period in a sub-band;
(b) performing sub-channel indexing for area allocation and data allocation;
(c) obtaining an address for the permuted data and addresses for sub-carriers within the sub-channel area; and (d) allocating the data of the permuted data address to sub-carriers within the sub-channel area by using the address of the sub-carrier.

12. The method as claimed in claim 11, wherein the time period unit is a single symbol time period unit.

13. The method as claimed in claim 11, wherein the time period unit includes a plurality of symbol time period units.

14. The method as claimed in claim 11, wherein the sub-channel indexing for data allocation and the area allocation are performed based on a sub-channel axis.

15. The method as claimed in claim 11, wherein the area allocation is performed based on a symbol axis, and the sub-channel indexing for data allocation is performed based on a sub-channel axis.

16. The method as claimed in claim 11, wherein step (a) is performed when a slot count (SlotCount) for a slot which is a symbol period occupied by the single sub-channel at a current symbol is greater than or equal to a slot beginning position (SlotStart) and there remains a sub-channel to be allocated.

17. The method as claimed in claim 16, wherein the slot start position is defined by $$\text{SlotStart}[i] = \lfloor \text{BandAllocStart}[i] \div \text{NschPerSlot} \rfloor,$$

where $i=0, \ldots, \text{NusedBand}-1$, wherein, BandAllocStart[i] denotes a beginning point of allocation for each band, i denotes a sequence number of each band or an index of an allocated band, NschPerSlot denotes a number of sub-channels included in one slot period within one band, and $\lfloor \ \rfloor$ denotes a rounding-down operation.

18. The method as claimed in claim 16, wherein, when the slot count in the current symbol corresponds to the slot beginning position, an allocation position in the single symbol time period unit is defined by if (SlotCount=SlotStart[$i$])start$SchN$=BandAllocStart[$i$]mod$Nsch$PerSlot else start$SchN$=0 if (BandResidual$Nsch[i]$≤($Nsch$PerSlotStart$SchN$))
end$SchN$=start$SchN$+BandResidual$Nsch[i]$ else
end$SchN$=$Nsch$PerSlot, wherein, startSchN denotes an index of a sub-channel from which allocation at a corresponding slot will begin, endSchN denotes (the index of a sub-channel fro which the allocation will end+1), and BandResidualNsch[i] denotes a number of sub-channels to be allocated for each band.

19. The method as claimed in claim 11, wherein step (a) is performed when there remains a sub-channel to be allocated in the current symbol.

20. The method as claimed in claim 19, wherein, when the sub-channel area is calculated, a beginning position and an end position of allocation according to the slot count in the current symbol are defined by if (SlotCount≥BandAllocStart[$i$]mod$NAMC$Slot)
start$SchN$=$\lfloor$BandAllocStart[$i$]÷$NAMC$Slot$\rfloor$ else
start$SchN$=$\lfloor$BandAllocStart[$i$]÷$NAMC$Slot$\rfloor$+1 if (SlotCount≥$Sch$AllocEndmod$NAMC$Slot)
end$SchN$=$\lfloor Sch$AllocEnd÷$NAMC$Slot$\rfloor$ else
end$SchN$=$\lfloor Sch$AllocEnd÷$NAMC$Slot$\rfloor$+1, wherein, NAMCSlot denotes the number of slots during a Band AMC sub-channel period, SchAllocEnd denotes a sum of the start position of allocation for each band and the number of sub-channels allocated to each band, and endSchN denotes (a sub-channel index at which the allocation ends+1).

* * * * *